US009654373B2

(12) United States Patent
Steinberger et al.

(10) Patent No.: US 9,654,373 B2
(45) Date of Patent: *May 16, 2017

(54) METHOD AND SYSTEM FOR INTERFERENCE DETECTION AND MITIGATION

(71) Applicant: Entropic Communications, LLC, Carlsbad, CA (US)

(72) Inventors: Ray Steinberger, San Diego, CA (US); Sagar Jogadhenu, San Diego, CA (US)

(73) Assignee: ENTROPIC COMMUNICATIONS, LLC, Carlsbad, CA (US)

( * ) Notice: Subject to any disclaimer, the term of this patent is extended or adjusted under 35 U.S.C. 154(b) by 323 days.

This patent is subject to a terminal disclaimer.

(21) Appl. No.: 14/285,503

(22) Filed: May 22, 2014

(65) Prior Publication Data

US 2014/0341054 A1 Nov. 20, 2014

Related U.S. Application Data

(63) Continuation of application No. 12/978,237, filed on Dec. 23, 2010, now Pat. No. 8,861,363.

(51) Int. Cl.
*H04L 12/26* (2006.01)
*H04L 1/00* (2006.01)
(Continued)

(52) U.S. Cl.
CPC ............ *H04L 43/12* (2013.01); *H04L 1/0003* (2013.01); *H04L 1/04* (2013.01); *H04L 12/2801* (2013.01); *H04L 43/0847* (2013.01); *H04B 3/00* (2013.01)

(58) Field of Classification Search
USPC ....... 370/229, 230, 236, 252, 317, 329, 332, 370/333, 395.2, 395.21, 437
See application file for complete search history.

(56) References Cited

U.S. PATENT DOCUMENTS 6,891,858 B1 * 5/2005 Mahesh ............... H04L 1/0017
370/235
7,586,888 B2 9/2009 Wang
(Continued)

FOREIGN PATENT DOCUMENTS

WO 2010141162 12/2010
WO 2011163072 12/2011

OTHER PUBLICATIONS

Extended European Search Report for Application No. 11851909.9, dated Aug. 5, 2015, 6 pages.

*Primary Examiner* — Kwang B Yao
*Assistant Examiner* — Nguyen Ngo
(74) *Attorney, Agent, or Firm* — McAndrews, Held & Malloy, Ltd.

(57) ABSTRACT

In a method for adjusting the modulation of information onto subcarriers transmitted on a network, a first modulation profile of a network node on the network is set a first density. A plurality of messages in support of a link maintenance operation (LMO) on the network are monitored. The first modulation profile of the network node is updated to a second modulation profile having a second density. The updating is based on the monitored messages. Interference is detected by determining that a link between the first network node and a second network node on the network is not conveying a predetermined class of messages correctly. The first network node is set to a third modulation profile more robust than the first and second modulation profiles in response to the detected interference. The third modulation profile is common to each network node on the network.

29 Claims, 9 Drawing Sheets

(51) Int. Cl.
*H04L 1/04* (2006.01)
*H04L 12/28* (2006.01)
*H04B 3/00* (2006.01)

(56) References Cited

U.S. PATENT DOCUMENTS

| | | |
|---|---|---|
| 7,830,834 B2 | 11/2010 | Das et al. |
| 8,374,122 B2 * | 2/2013 | Meier .................... H04W 8/005 370/328 |
| 8,861,363 B2 * | 10/2014 | Steinberger ........... H04L 1/0003 370/236 |
| 2008/0101210 A1 | 5/2008 | Thompson et al. |
| 2008/0102845 A1 * | 5/2008 | Zhao .................... H04W 72/085 455/450 |
| 2008/0250133 A1 | 10/2008 | Lee et al. |
| 2008/0279219 A1 | 11/2008 | Wu et al. |
| 2009/0092154 A1 * | 4/2009 | Malik .................. H04L 12/2861 370/480 |
| 2009/0254794 A1 | 10/2009 | Malik et al. |
| 2009/0323684 A1 * | 12/2009 | Chu .................... H04L 12/2801 370/389 |
| 2010/0142540 A1 | 6/2010 | Matheney et al. |
| 2010/0146616 A1 | 6/2010 | Garrett et al. |
| 2010/0150016 A1 | 6/2010 | Barr |
| 2010/0154017 A1 * | 6/2010 | An ...................... H04L 12/2801 725/111 |
| 2012/0140647 A1 * | 6/2012 | Gao .................... H04L 43/0811 370/252 |

\* cited by examiner

METHOD AND SYSTEM FOR INTERFERENCE DETECTION AND MITIGATION

CROSS-REFERENCE TO RELATED APPLICATIONS

This application is a continuation of and claims priority from U.S. application Ser. No. 12/978,237 filed Dec. 23, 2010, which is incorporated herein by reference in its entirety.

FIELD

This disclosure is directed generally to a communication network, and in particular to improving network performance by detecting and mitigating interference.

BACKGROUND

In some networking environments, communication networks may be formed when multiple interoperable nodes communicating over a shared medium detect the existence of other nodes. One such network operates in accordance with the well-known Multimedia over Coax Alliance ("MoCA") MAC/PHY Specification v.1.0 or v.1.1. In such a network, nodes may function as "client" nodes. One of the client nodes is selected as a network coordinator (NC). A network typically has a single NC node and any number of client nodes. The NC node transmits beacon packets, media access plan (MAP) packets and other control information to manage the network.

MoCA networks may use in-home coaxial cable as the medium over which information is communicated. Such networks use orthogonal frequency division multiplexing (OFDM) modulation of data. OFDM is a digital multi-carrier modulation method in which a frequency band corresponding to a carrier comprises a number of closely spaced orthogonal subcarriers that are used to transport data. Data is divided into separate streams to be carried on the subcarriers. Each link between a pair of network nodes has a modulation profile in each direction that specifies the density of the modulation used on the subcarriers transmitted in that direction. For example, in accordance with one modulation profile, a first subcarrier employs 16-QAM. In accordance with 16-QAM, 16 constellation points represent one of the 16 possible values that can be represented by a four bit binary information word. A second subcarrier employs a denser modulation, such as 64-QAM (having 64 possible constellation points, each representing one of the 64 possible values of a 6 bit information word). Each of the other subcarriers has a particular modulation density which may be greater than, less than, or the same as the first and second subcarriers. In MoCA networks, binary phase shift keying (BPSK) and quadrature phase shift keying (QPSK) are considered less dense QAM modulation schemes and are also used. The denser a modulation profile, the less robust the communication. A more dense profile means more constellation points. In turn, more constellation points means more bits transmitting in the same amount of time. A signal that is transmitted using a more dense modulation scheme will be more susceptible to noise and other factors in the channel that can cause the packet error rate to be higher.

FIG. 1 illustrates one example of a communication network 200 including a plurality of network nodes 210a-g (collectively referred to as "network nodes 210") each communicating with other nodes through a communication medium 202. Examples of the communication medium 202 include, but are not limited to, coaxial cable, fiber optic cable, a wireless transmission medium, an Ethernet cable, or the like. In one embodiment, the communication medium 202 is a coaxial cable network.

In one embodiment, network nodes 210 are communication devices within components of a home entertainment system. Such components include, for example, set top boxes (STBs), televisions (TVs), computers, DVD or Blu-ray players/recorders, gaming consoles, or the like. The nodes are coupled to each other via the communication medium 202. In some instances, the component of the home entertainment system is itself considered to be the network node.

In some embodiments, the network 200 may operate in accordance with the requirements of a MoCA network. A MoCA network dynamically assigns a network node 210 to perform the functions of a NC. Any network node 210 can function as the NC. For the sake of this example, the network node 210a performs the NC functionality. The NC forms a full mesh network architecture between each network node 210 and its peers.

Moving on to FIG. 2, each of the network nodes 210 may include a physical interface 302 including a transmitter 304 and a receiver 306. The transmitter and receiver are in signal communication with a processor 308 through a data bus 310. The transmitter 304 may include a modulator 312 for modulating data according to a quadrature amplitude modulation (QAM) scheme such as, for example, BPSK (binary phase shift keying), QPSK (quadrature phase shift keying), 8-QAM, 16-QAM, 32-QAM, 64-QAM, 128-QAM, or 256-QAM, or another modulation scheme. In addition, the transmitter may include a digital-to-analog converter (DAC) 314 for transmitting modulated signals to other network nodes 300 through the communication medium 202.

Receiver 306 may include an analog-to-digital converter (ADC) 316 for converting an analog modulated signal received from another network node 210 into a digital signal. The receiver 306 may also include an automatic gain control (AGC) circuit 318 for adjusting the gain of the receiver 306 to properly receive the incoming signal and a demodulator 320 for demodulating the received signal. One of ordinary skill in the art will understand that the network nodes 210 may include additional circuitry and functional elements not described herein.

The processor 308 may be any central processing unit (CPU), microprocessor, micro-controller, or computational device or circuit for executing instructions. As shown in FIG. 2, the processor 308 is in signal communication with a computer readable storage medium 322 through data bus 310. The computer readable storage medium may include a random access memory (RAM) and/or a more persistent memory such as a read only memory (ROM). Examples of RAM include, but are not limited to, static random-access memory (SRAM), or dynamic random-access memory (DRAM). A ROM may be implemented as a programmable read-only memory (PROM), an erasable programmable read-only memory (EPROM), an electrically erasable programmable read-only memory (EEPROM), or the like as will be understood by those skilled in the art.

When the network 200 is initially formed (i.e., when the second new node is added to the network) or when a new network node 210 is admitted, an admission link maintenance operation ("LMO") is performed. In accordance with the admission LMO process, the NC transmits probes to the new node. The new node receives the probes and prepares a probe report. The probe report is then sent to the NC. In addition, the new node receives probes from all of the other nodes in the network. The new node prepares probe reports for each node from which the new node received a probe. The new node also transmits probes to each of the other nodes in the network and receives probe reports from each. In general, an LMO involves transmitting probe messages formed using a predetermined bit sequence and length. The probes are transmitted from one network node to another to estimate the characteristics of the communication link between the nodes of the network. The receiving network node measures the energy of received probes and compares the measurements against predefined thresholds to determine the number of bits per subcarrier that can be supported by the communication link. The process of specifying the bit density to be used over each subcarrier is called "bit loading". Bit loading adapts the modulation to the conditions of the network. In accordance with bit loading, modulation using a higher constellation density is used with subcarriers that have higher signal-to-noise ratio (SNR) and modulation using a lower constellation density is used with carriers that have lower SNR. The set of modulations used for all of the subcarriers on a link between a first node and a second node is referred to as a "modulation profile". Accordingly, the modulation profile identifies the modulation used for each subcarrier on the link from one node to another node. There is a unique modulation profile associated with the link from one node to the each other nodes. The modulation profile is not symmetrical. That is, the modulation profile used on the link from a first node to a second node may be different from the modulation profile used on the link in the other direction (i.e., from the second node to the first node). Once the admission process is complete, each node will occasionally perform a "periodic LMO". If there is interference in the communication of any of the messages that are essential to the admission process, the new node will be refused admission and will have to repeat the attempt to be admitted.

Referring to FIG. 3 which shows some of the messaging involved in a periodic LMO, in some embodiments, a probe 420 is sent from a network node 410b. The node 410b sending the probe 420 is referred to as an "LMO node". The probe 420 may be one of a plurality of probes transmitted in support of the periodic LMO. The probe 420 is sent directly to a network node 410c. The LMO node 410b then sends a report request message 422 to the NC 410a. The NC 410a receives the request and sends the request 422 to the network node 410c. The network node 410c sends a probe report 424 back to the NC 410a. The report informs the LMO node 410b of any new bit loading to be used for subsequent packets sent to the network node 410c. Any such bit loading will take into consideration the desired error rate, such as $10^{-6}$ and the presence of interference or environmental variations which might alter the link conditions (e.g., variations in temperature or voltage since the last LMO). The sequence of events that includes probe(s), report request(s), and probe report(s) constitutes an LMO cycle. An LMO cycle is successful when all management packets (e.g., report requests, reports, media access plan packets, beacons and reservation request packets) are successfully delivered.

Interference may be present and may arise from various sources, e.g., television signals such as Advanced Television Systems Committee (ATSC) digital television broadcasting signals. An ATSC interference signal has 6 MHz bandwidth and may have various center frequencies. ATSC interference can occupy a bandwidth corresponding to some of the subcarriers. As used herein, the term "sustained interference" refers to interference that is substantially non-varying and present over a relatively long period of time (e.g., several minutes). Interference may also be dynamic interference, as opposed to sustained interference. Dynamic interference may be caused by turning on a television station transmitter, for example and may cause high packet error rate in excess of the specified error rate (e.g., $10^{-6}$). Messages (e.g., packets) that are transmitted using OFDM subcarriers may be affected by interference. Such interference can result in errors. In particular, one problem that occurs in MoCA and similar networks is that when interference is present, some messages may not get through. For example, dynamic interference may cause incorrect transmission from the network node 410c to the NC 410a, as shown by a cross (X) and dashed lines corresponding to this link in FIG. 3. Accordingly, adjustments to the bit loading might not occur if the probe report 424 is not successfully conveyed to the network node 410b. After a predetermined amount of time, the LMO node will once again send a report request 426. The report request 426 will be relayed by the NC to the network node 410c. The network node 410c in turn will unsuccessfully attempt to transmit the probe report 428 to the NC again.

Another case, shown in FIG. 4, in which interference occurs on the link from the NC 410a to the LMO network node 410b is when the LMO node 410b sends a probe request 422 successfully to the network node 410c via the NC 410a. Node 410c then relays the report 424. However, the report 424 is unsuccessfully relayed to the LMO node 410b due to interference, as shown by dashed lines and a cross in FIG. 4. The LMO node 410b, which does not know of the interference, sends another report request 426, The Node 410c then relays another report 428, and the pattern may repeat, with a responsive report 424, 428 not being conveyed correctly on the link between the NC 410a and the LMO node 410b each time.

As can be seen by the examples of FIGS. 3 and 4, interference may cause a predetermined class of messages (e.g., management packets such as the probe request 422 or the probe report 424) to be received incorrectly. Such management packets may be relatively large compared to other messages and may therefore occupy a substantial fraction (or all) of the subcarriers transmitted between nodes. As a result, such management packets may be transmitted using subcarriers that are affected by the interference. On the other hand, smaller messages, such as heartbeat messages, may be transmitted using fewer subcarriers. In particular, these smaller messages may be transmitted and received successfully without using any subcarriers affected by the interference. Because heartbeat messages may be transmitted and received successfully, the network is kept alive but is ineffective for transmitting LMO messages (thus the communication becomes deadlocked). Because management packets (such as probe reports that contain adjusted bit loading information in the face of newly turned-on interference) are not received accurately enough to be useful, a modulation profile for an affected node may not be adjusted correctly. Hence a higher packet error rate may persist. As a result of the heartbeats not detecting the failure of the communication, the network 200 may not dissolve and reform, as would otherwise be the case. Rather, the network may continue to operate poorly for larger messages. It should be understood that interference may also impede the transmission of smaller packets. Therefore, even such smaller packets may not be communicated accurately.

Accordingly, there is a need for a method and apparatus for ensuring that LMO the network can properly adjust the modulation profiles and maintain the proper operation of the network in the face of interference.

SUMMARY

In accordance with some embodiments, a method is provided for adjusting the modulation of information onto subcarriers transmitted on a network. In accordance with this method, when there is a breakdown due to interference in the communication of link maintenance operation (LMO) messages between a network coordinator (NC) and a network node, the NC will force the use of robust modulation profile for communications over the link in which the breakdown occurs. In accordance with one embodiment, the request for the use of the more robust modulation profile is made over a beacon message or a Media Access Plan (MAP) message.

The robust modulation profile indicates a specified set of densities for modulation used for communications between the network node and the NC. In addition, a protocol is used that causes information bits in the messages transmitted over the link with the interference to be repeated. Use of the robust modulation profile and the associated protocol ensures the highest degree of certainty that information can be successfully transmitted over the link. The robust modulation profile is a "common" profile that is available to all nodes prior to network formation.

The modulation profile can be updated when the next LMO procedure is executed. The update accounts for changes to the characteristics of the link. Accordingly, if interference is no longer detected on the links between the network node and the NC and the link between the LMO node and the NC, the NC will resume the normal process in which the modulation profile associated with the link is set based upon a probe report characterizing the link between the LMO node and the NC and the network node and the NC.

In some embodiments, a computer readable non-transitory storage medium has instructions stored on it. When executed by a processor, the instructions cause the processor to perform the operations of the method described above.

In some embodiments, each network node has a receiver, a transmitter, and a processor. The receiver receives LMO messages in support of an LMO. The transmitter transmits LMO messages in support of an LMO. The processor is coupled to the transmitter and receiver. The processor: (1) establishes a modulation profile for that link from the LMO node to the node comprising the processor; (2) updates the modulation profile based on additional LMO messages; and (4) uses a robust modulation profile for communications on the link in response to instructions received from an NC.

BRIEF DESCRIPTION OF THE DRAWINGS

The following will be apparent from elements of the figures, which are provided for illustrative purposes and are not necessarily to scale.

DETAILED DESCRIPTION

This description of the embodiments of the disclosed method and apparatus is intended to be read in connection with the accompanying drawings, which are to be considered part of the entire written description.

Figure 5:
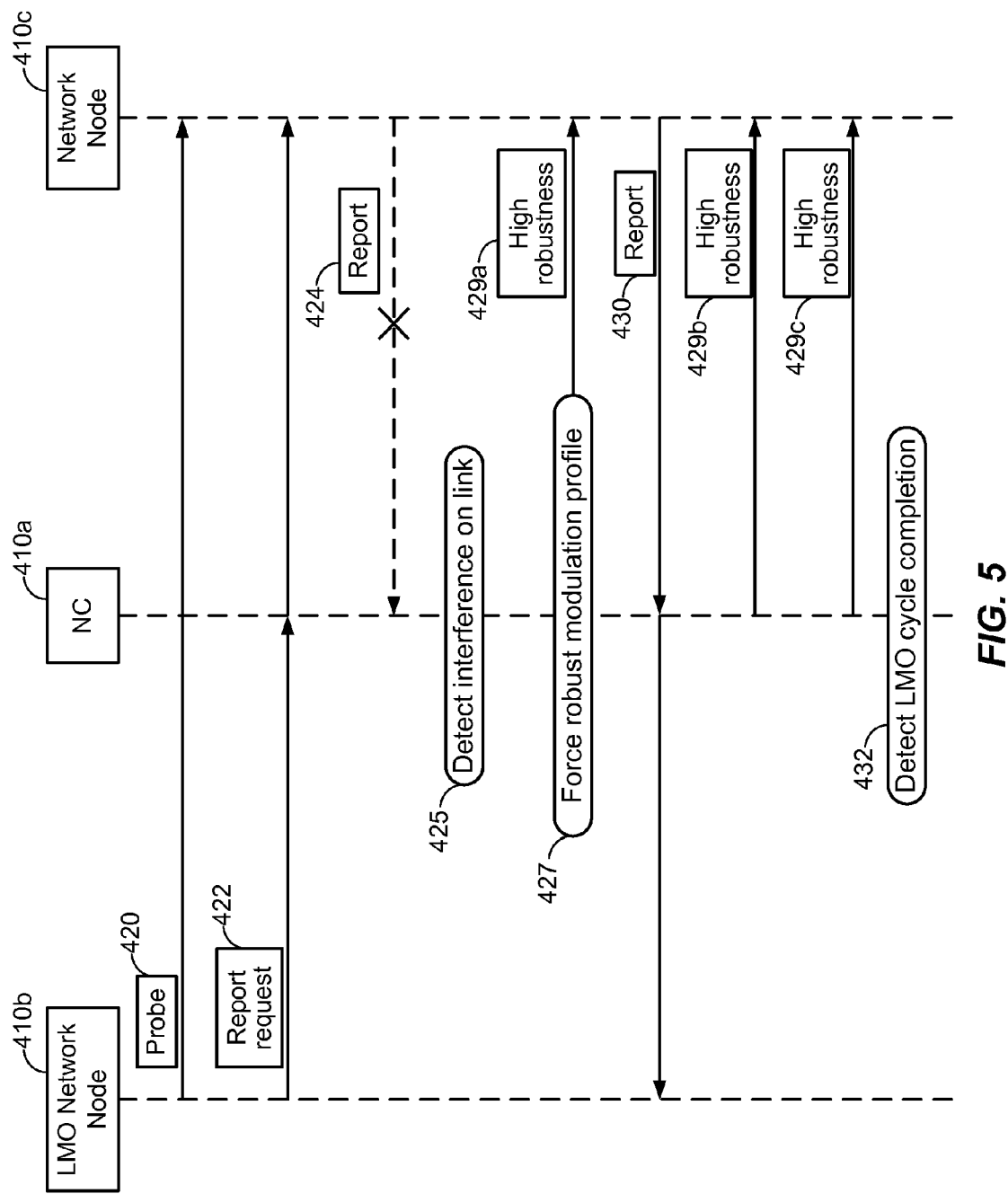
FIG. 5 is a signal diagram illustrating a flow of data across the communication network of FIG. 1, in an example where a network coordinator detects erroneous reception of probe reports from a network node.

Referring to FIG. 5, in accordance with one embodiment of the disclosed method and apparatus, the NC 410a monitors LMO-related management packets (e.g., report requests and reports) to detect suspect physical communication links impacted by interference, such as interference from an Advanced Television Systems Committee (ATSC) signal. The NC 410a may detect interference on a link in one of several ways. One example of a detection technique is shown in FIG. 5. In accordance with the method of FIG. 5, an LMO node 410b sends a probe directly to a network node 410c. The LMO node 410b then sends a report request 422 to the NC 410c. The NC 410a will then relay that report request to the network node 410c. The network node 410c will in turn respond to the NC 410a by transmitting a report 424 back to the NC 410a. If there is interference on the link between the network node 410c and the NC 410a, the NC 410a will not receive management packets correctly (e.g., such as the report 424). After a predetermined amount of time, the LMO node will once again send a report request 426. The report request 426 will be relayed by the NC to the network node 410c. The network node 410c in turn will unsuccessfully attempt to transmit the probe report 428 to the NC again. If the problem persists, the NC 410a will assume that there is interference on the link. In one case, the NC 410a will wait for a predetermined number of erroneous packets over a predetermined time interval (e.g., N or more report packets with cyclic redundancy check (CRC) errors were received from the node 410c within M seconds).

Upon detection of interference on the link between the network node 410c and the NC 410a (such detection is shown as 425 in FIG. 5), the NC 410a overcomes the interference by forcing adoption of a more robust modulation profile, shown as 427. Forcing the use of a robust modulation profile includes having the NC 410a use the robust profile and having the network node 410c transmit using the robust profile on the problematic link. The NC 410a forces the use of the robust modulation profile by sending a message 429a instructing the network node 410c to adopt the robust modulation profile for transmissions to the NC 410a. In accordance with one embodiment of the disclosed method and apparatus, the NC 410a instructs the network node 410c to use the robust modulation profile through beacon packets transmitted by the NC 410a and/or MAP packets transmitted by the NC 410a. The beacon indicates what profile will be used by the MAP and the MAP indicates what modulation profile is to be used by the rest of the transmissions from the network node 410c to the NC 410a.

Whereas the network node 410c might ordinarily determine the modulation profile as a result of the routine LMO operation and the NC 410a would ordinarily indicate that profile in the beacon and MAP packets that the NC 410a sends, the network node 410c is forced to use a predetermined robust modulation profile in response to receiving the message 429a in the beacon and MAP packets from the NC 410a. This predetermined robust modulation profile is known by all the network nodes on the network and is more robust than any other available modulation profile, e.g., due to minimal bit loading (lower density than any other modulation profile available to the nodes). In addition, to the robust modulation profile, the NC 410a will require the use of a protocol that includes a repetition of certain of the informational bits. In one embodiment of the disclosed method and apparatus, the network node 410c will transmit using a diversity mode, such as is described in section 4.3.6.4 of the MoCA 1.0 specification.

Diversity mode includes the use of the most robust modulation mode mandated by the MoCA 1.0 specification. In addition to providing minimal density, diversity mode provides increased robustness through repetition of bits in the OFDM symbols a predetermined number of times. For example, in MoCA's diversity mode, bits are transmitted seven times, distributed throughout the subcarriers for increased probability of correct transmission through redundancy and subcarrier diversity.

In the following discussion, the diversity mode is discussed, although other highly robust modulation profiles may be used in other embodiments of the disclosed method and apparatus. In the context of MoCA networks, a "diversity mode override" may be communicated in beacon packets via the ASYNCHRONOUS_MAP_PROFILE field and in media access plan (MAP) packets via the Data Allocation Unit (DAU) element's PHY_PROFILE field.

For relaying messages between any two network nodes, the NC 410a maintains two modulation profiles, one for each direction of transmission. In other words, the modulation profile used by the NC 410a may be indexed by an ordered pair (A, B), where A designates a sending node and B designates a recipient node. It should be noted that in some embodiments, switching to diversity mode for the link between the node 410c and the NC 410a does not change the modulation profile used for the link between the NC 410a and the node 410b. In this way, only the link affected by interference in the selected direction will be required to use the less efficient modulation profile.

Once the NC 410a indicates that the link from the node 410c to the NC 410a are to use diversity mode, a report that formerly failed to reach the NC 410a correctly may now be conveyed correctly, as shown by the report 430 that is correctly sent from the network node 410c to the LMO node 410b via the NC 410a. The report 430 may include the same data as the report 424 but is shown with a different reference numeral for clarity. In some embodiments, the message 429a is repeated periodically to ensure the continued use of diversity mode (as shown by messages 429b and 429c) until completion of the LMO cycle. When the NC 410c detects that the LMO cycle has completed (shown as 432), the NC 410a and the node 410c may start using the modulation profile determined by the LMO cycle that just completed. It should be noted that while the purpose of the LMO cycle is to determine the proper modulation profile to be used on the link between the LMO node 410b and the network node 410c, the problems that occur due to interference (and which are solved by the use of the robust modulation profile) occur on either the link between the NC 410a and the LMO node 410b or on the link between the NC 410a and the network node 410c.

Figure 6:
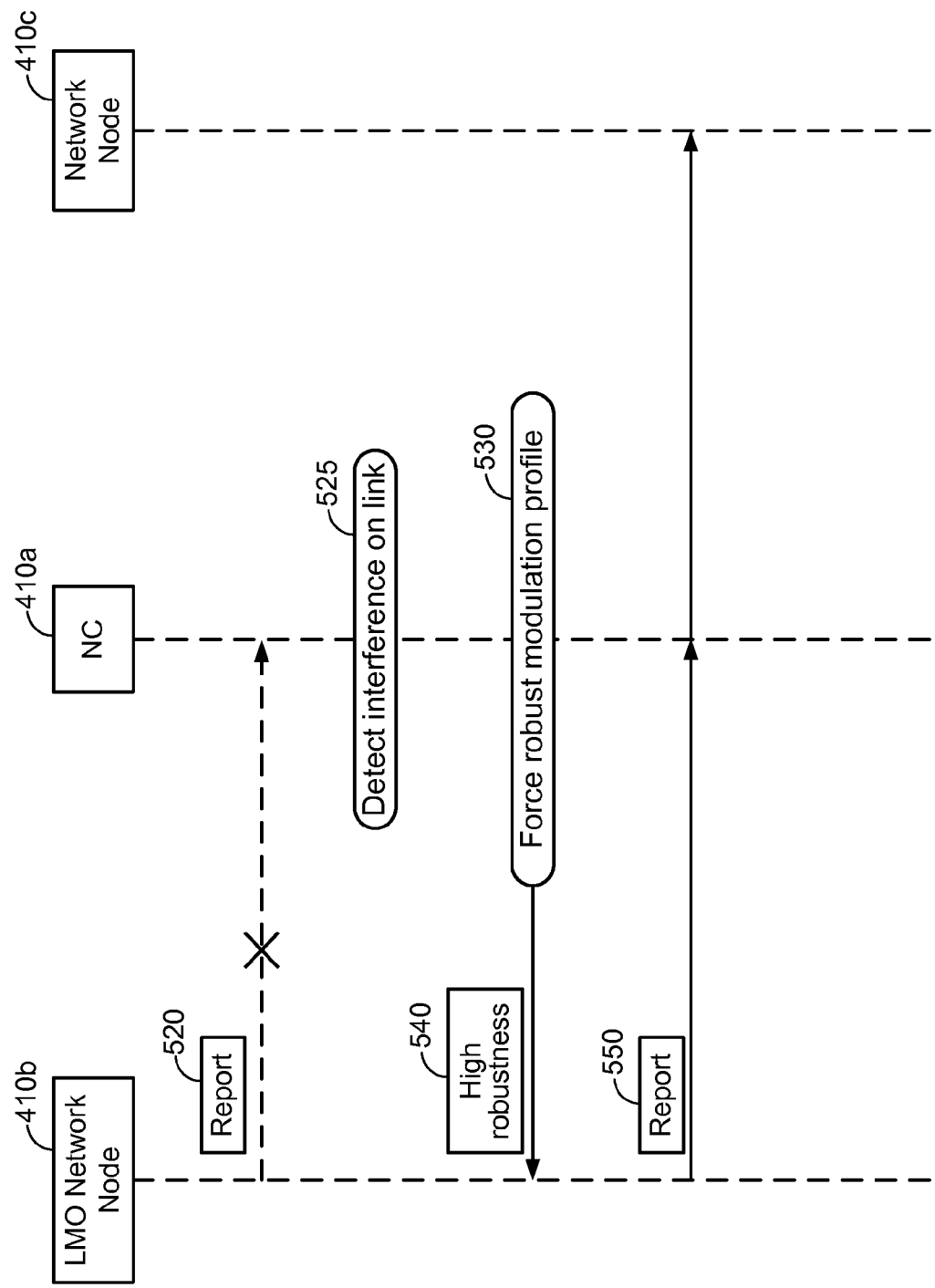
FIG. 6 is a signal diagram illustrating a flow of data across the communication network of FIG. 1, in an example where a network coordinator detects erroneous reception of an accumulated probe reports from a link maintenance operation (LMO) network node.

Referring to FIG. 6, the NC 410a may detect interference on the link between the LMO node 410b and the NC 410a. In this case, the NC 410a detects that an accumulated report 520 has not been transmitted correctly to the NC 410a. In addition, acknowledgement messages are sent by the NC 410a if the report is correctly received. Detection of interference on the link may be as was the case in the foregoing example regarding report 424 of FIG. 5. However, in this example, the detection is based on detection of CRC errors involving the report 520. In other words, the NC 410a may use the same technique (involving determining whether a predetermined number of packets fail to be received correctly within a predetermined time interval) with report originating from any network node. Upon detecting interference on the link (shown as 525), the NC 410a forces adoption of a more robust modulation profile (e.g., diversity mode), e.g., by forcing the use of a robust modulation profile on the link from the LMO node 410b to the NC 410a and by sending a message 540 instructing the LMO node 410b regarding the use of the more robust modulation profile. With the more robust modulation profile enabled, report 550 may now be successfully transmitted from the LMO node 410b to node 410c via the NC 410a. For convenience, the message indicating the use of diversity mode is transmitted periodically until completion of the LMO cycle. While not shown in FIG. 6, such repetition will be understood to occur in some embodiments as in FIG. 5.

Figure 7:
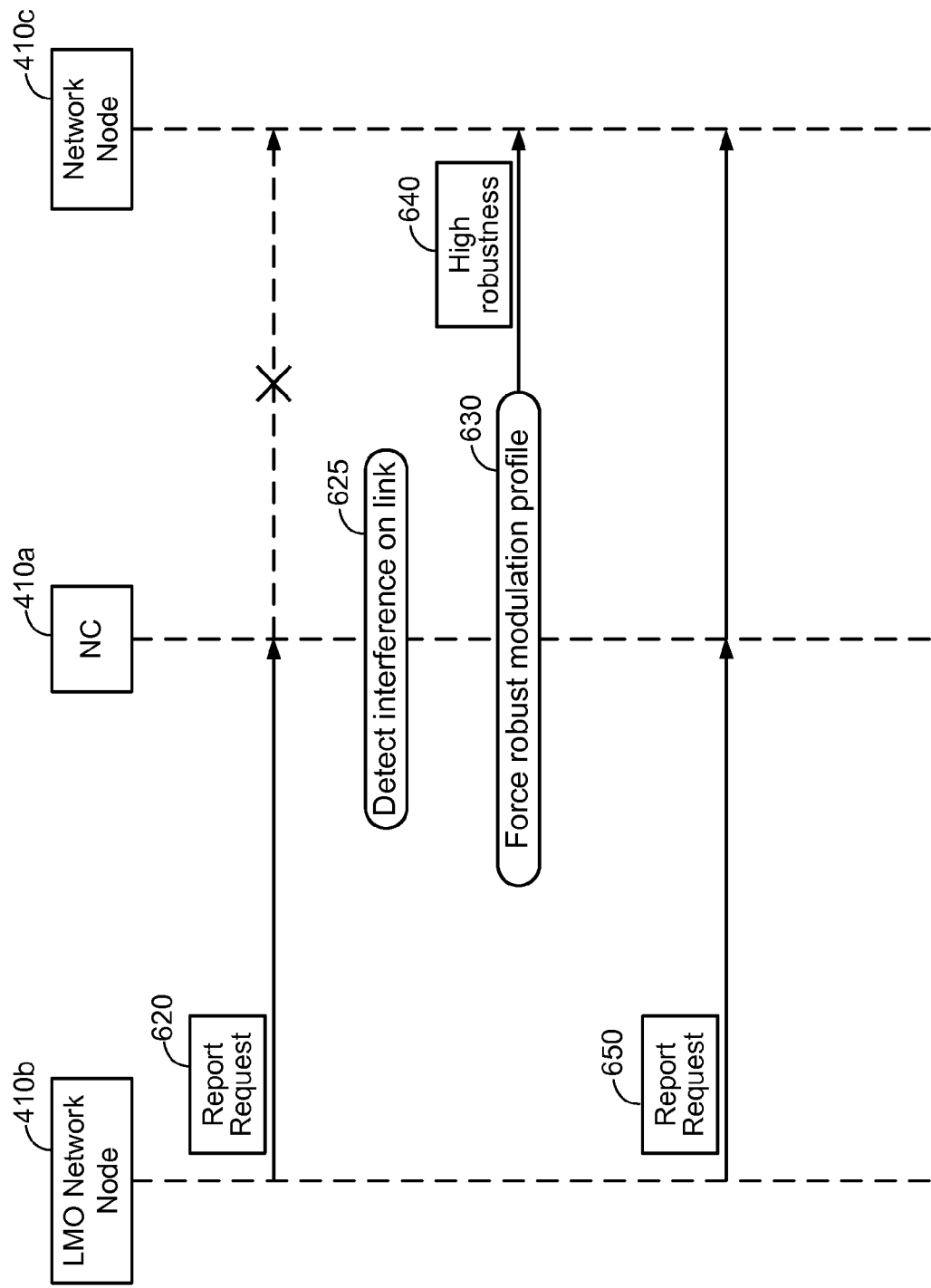
FIG. 7 is a signal diagram illustrating a flow of data across the communication network of FIG. 1, in an example where a network coordinator detects erroneous communication of requests for probe reports from the NC to the network node.

Referring to FIG. 7, the NC 410a may also detect interference between the NC 410a and the network node 410c based on detecting reception of more than a predetermined number of report requests 620 being sent by the LMO node 410b within a predetermined interval. It should be noted that only one such report request 620 is shown in FIG. 7 for simplicity. In FIG. 7, the NC 410a counts CRC errors associated with report request 620 (rather than a report as in FIG. 6) originating from the LMO node 410b. Other parts of FIG. 7 are similar to corresponding parts of FIG. 6 and do not require further explanation.

Figure 1:
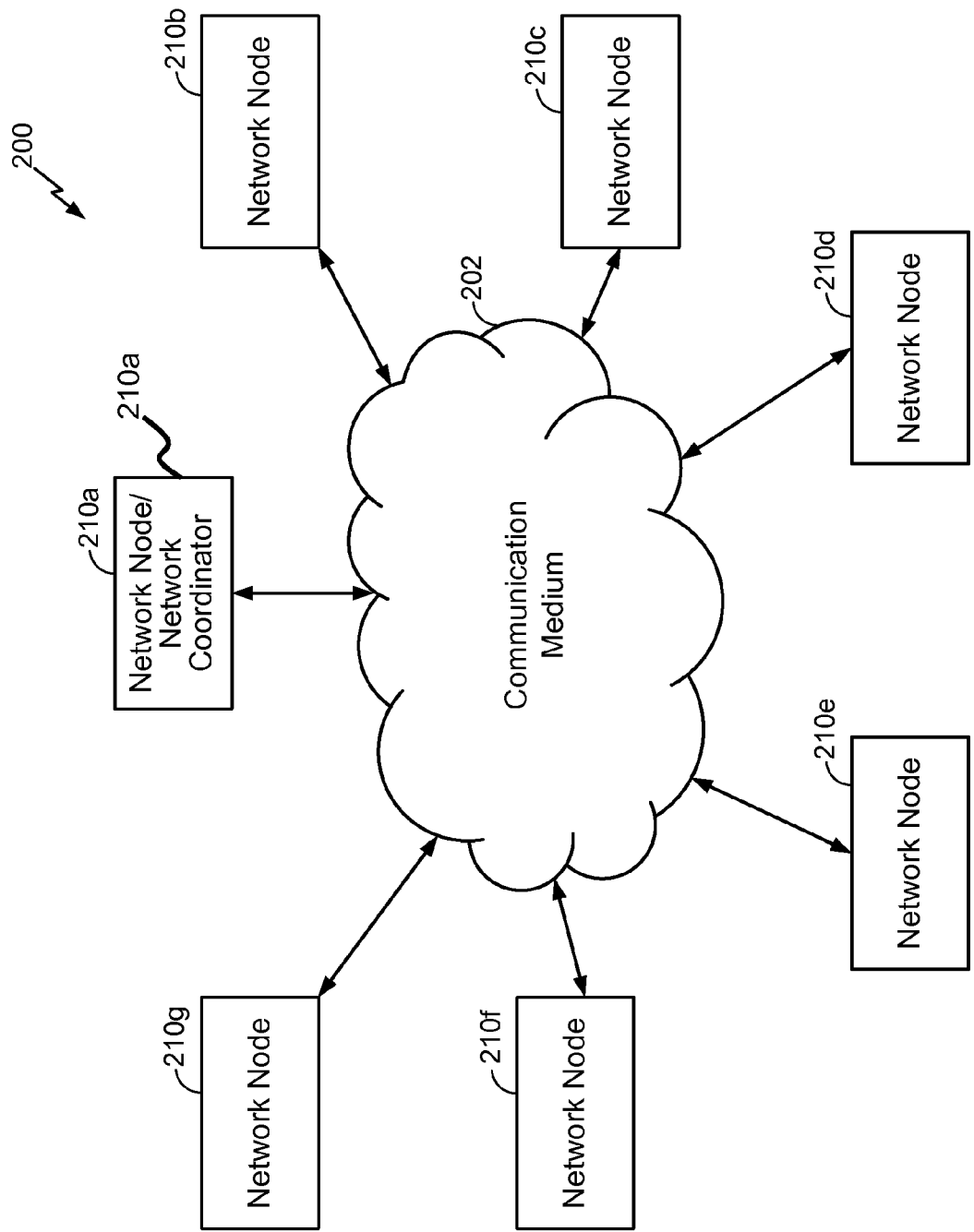
FIG. 1 is a block diagram of a communication network.
Figure 2:
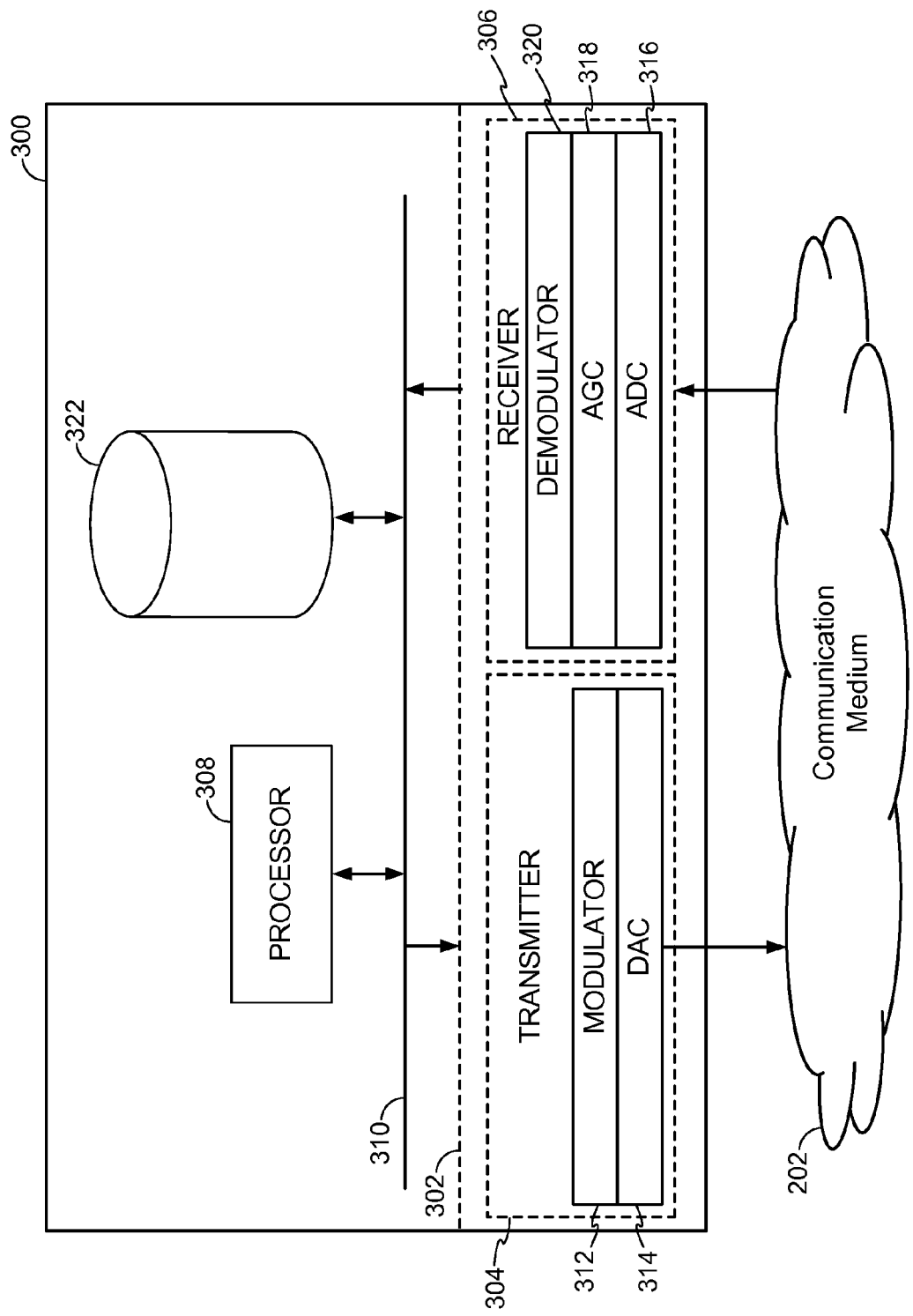
FIG. 2 is a block diagram of a network node in accordance with the communication network illustrated in FIG. 2.
Figure 3:
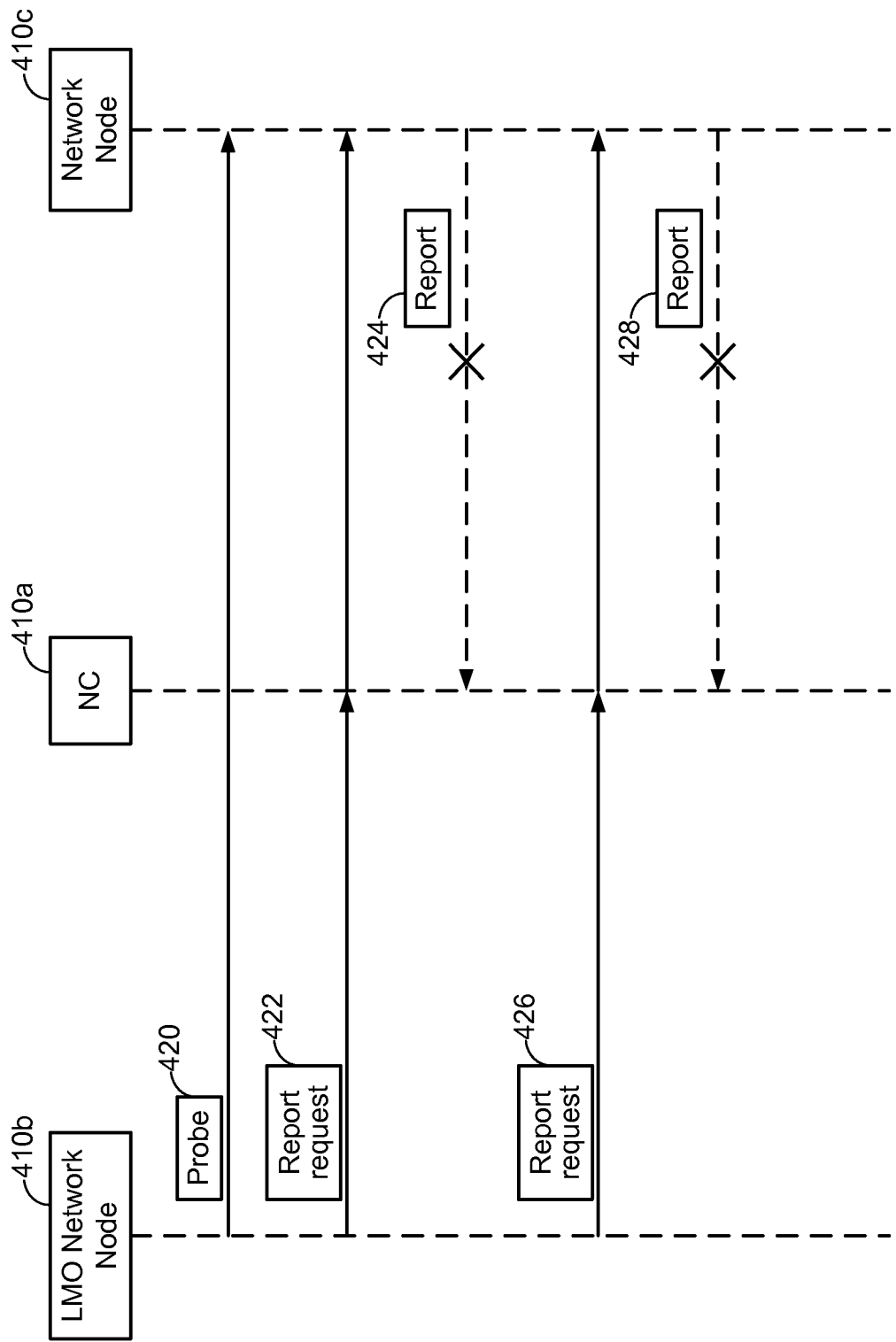
FIG. 3 is a signal diagram illustrating a flow of data across a prior art network of FIG. 1, during which there is interference that prevents a probe report from being received by the NC.
Figure 4:
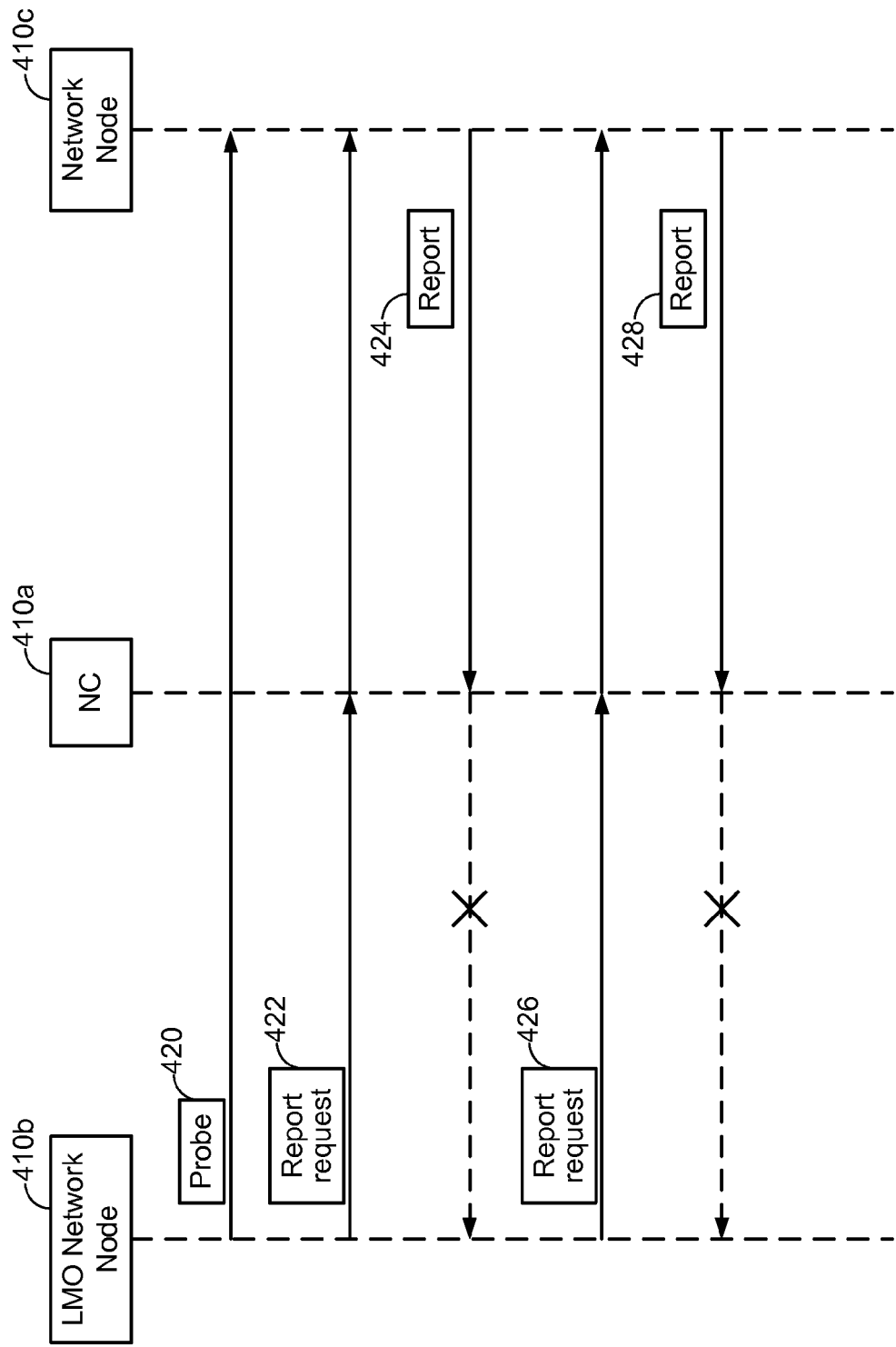
FIG. 4 is a signal diagram illustrating a flow of data across a prior art network of FIG. 1, during which there is interference that prevents a probe report from being received by the LMO node.
Figure 8:
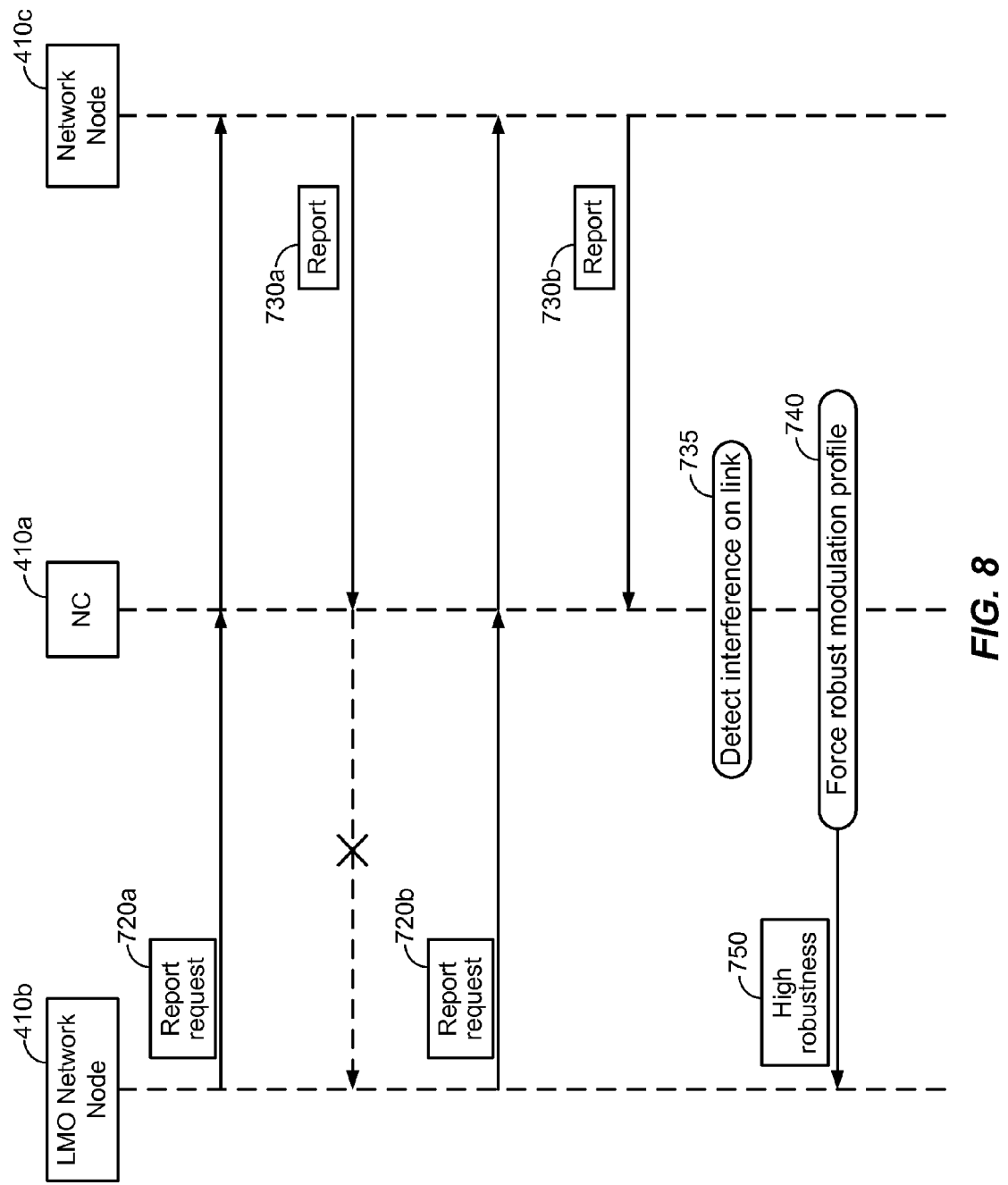
FIG. 8 is a signal diagram illustrating a flow of data across the communication network of FIG. 1, in an example where a network coordinator detects repeated transmission of probe reports and/or requests for probe reports.

Referring to FIG. 8, the LMO node 410b sends a probe request 720a successfully to node 410c via the NC 410a. Node 410c sends a report 730a responsively, which is correctly sent to the NC 410a. However, the probe report is unsuccessfully relayed to the LMO node 410b due to interference, as shown by dashed lines and a cross. The LMO node 410b, which does not know of the interference, sends another report request 720b, and the pattern may repeat, with a responsive report such as report 730b not being conveyed correctly on the link between the NC 410a and the LMO node 410b each time. The NC 410a, which has visibility to these probe reports and report requests due to its role as an intermediary in such communications, may detect that 410b is repeatedly sending report requests and/or that node 410c is repeatedly sending probe reports within an LMO session. The NC 410a may thus detect that there is interference from the reception of more than a predetermined number of reports or report requests within a predetermined time interval. The predetermined number and the predetermined time interval may be the same or different for reports and report requests using this technique. Other parts of FIG. 8 are similar to corresponding parts of FIGS. 4-5 and do not require further explanation.

Thus, the NC 410*a* may use various techniques for identifying and overcoming interference on suspect links. One technique is to detect reception of more than a predetermined number of management packets with CRC errors from a node within a predetermined time interval. The management packets with CRC errors in this technique may be, for example, probe reports (as in FIGS. 4-5) or report requests (as in FIG. 7), with reports originating from any node (e.g., a non-LMO node as in FIG. 5 or an LMO node as in FIG. 6). Another technique is to detect repeated requests for probe reports from the LMO node. Another technique is to detect repeated transmissions of probe reports within an LMO session. With interference detected by any of these techniques, the NC 410*a* may then mitigate interference by forcing the use of a more robust modulation profile, e.g., by the NC 410*a* instructing another node sharing a problematic link to use the more robust profile.

Figure 9:
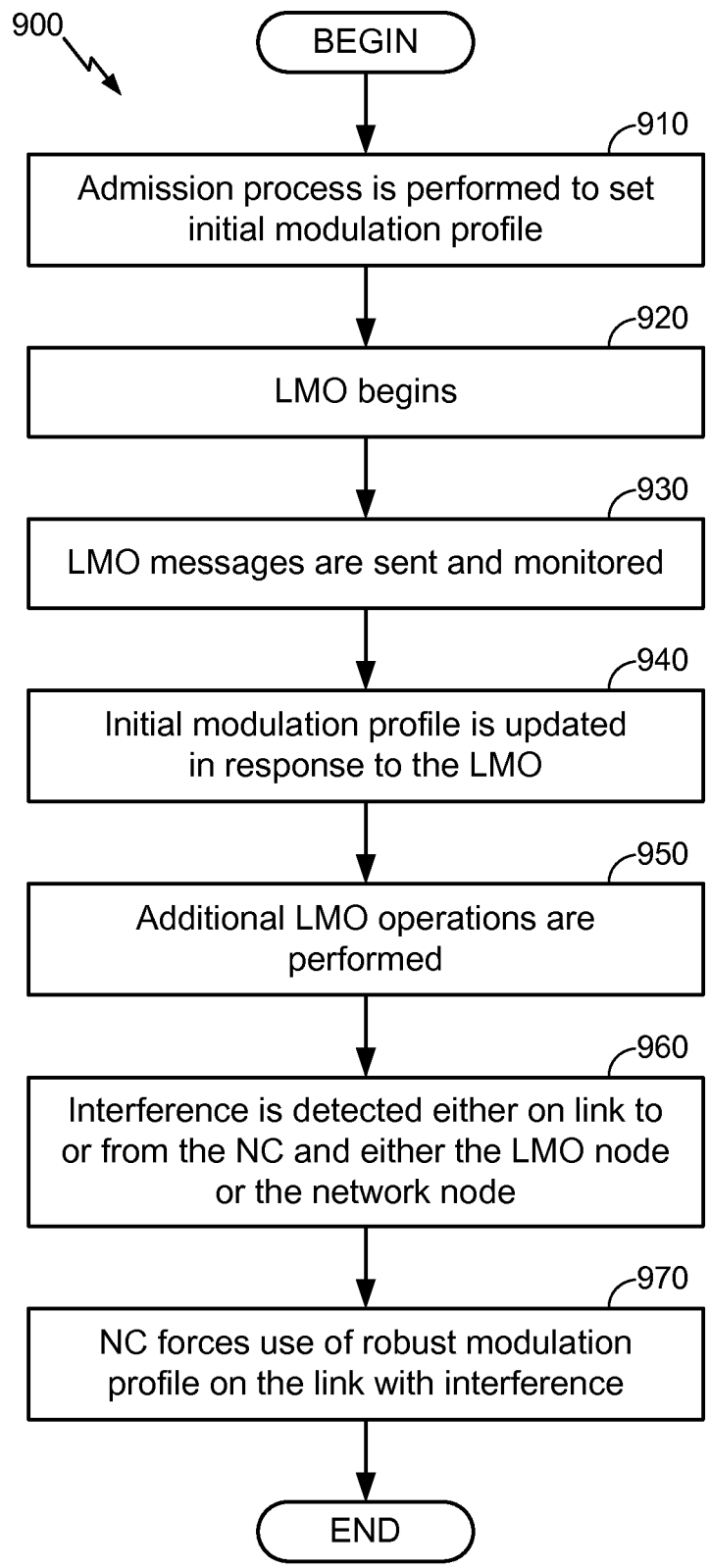
FIG. 9 is a flow diagram in accordance with one embodiment of the disclosed method and apparatus.

FIG. 9 is a flow diagram in accordance with one embodiment of the disclosed method and apparatus. After the process 900 begins, an initial modulation profile is established for the link from a new node entering the network and each other node of the network (910). Some time after admission, an LMO is started with the new node being designated as an LMO node (920). A plurality of messages are sent in support of a LMO on the network. These messages are monitored (930). As a result of the LMO, the modulation profiles to be used in each link from the LMO node to each other node are updated (940). The updating of the modulation profiles are based on LMO messages (such as probe reports). Sometime later, another LMO may be initiated (950) during which interference may be detected on one of the links between the NC and either the LMO node or a network node with which the LMO node is attempting to update the modulation profile (960). The interference is detected by determining that: (1) the link from the LMO node to the NC is not conveying a predetermined class of messages correctly; (2) the link from the NC node to the network node is not conveying a predetermined class of messages correctly; (3) the link from the network node to the NC is not conveying a predetermined class of messages correctly; or (the link from the NC to the LMO node is not conveying a predetermined class of messages correctly. If such interference is detected, then modulation profile to be used for communication over the link with the interference is set to a robust modulation profile in response to the detected interference (970). It should be clear that even though the purpose of the LMO operation is to update the modulation profile of the link from the LMO node to the network node, the links that will cause problems due to interference are the links between the LMO nodes and the NC and the links from the network node to the NC. It is these links that must be made secure in order for the probe report sent as a part of the LMO process to be received by the LMO node, thus allowing the LMO node to determine the proper modulation profile to use in communicating with the network node at issue.

By providing techniques for overcoming interference that conventionally blocks LMO completion, various embodiments promote efficient adaptation to adverse network conditions. The MoCA specification does not currently specify how to handle the "blocked LMO" case, and conventional techniques in the prior art have not used the NC (e.g., the NC 410*a*) to overcome similar situations. In various embodiments, a modulation profile chosen by the NC rather than a client (sender) node is used, so the NC is able to force a diversity mode override that enables recovery from interference without more severe measures such as disconnection of a network node.

In some embodiments, computer readable storage medium 322 may have instructions stored on it. When executed by processor 308, the instructions may cause processor 308 to perform operations described above, including those of process 800.

Although examples are illustrated and described herein, embodiments are nevertheless not limited to the details shown, since various modifications and structural changes may be made therein by those of ordinary skill within the scope and range of equivalents of the claims.

What is claimed is:

1. A method for adjusting modulation on a network, the method comprising:
   determining that at least one of a probe request or a probe report has been transmitted during a link maintenance operation (LMO) between an LMO node and a network node;
   detecting interference on a link between the LMO node and a network coordinator (NC) or on a link between the network node and the NC that interferes with reception of transmitted probe request or probe report; and
   in response to the detected interference, the NC sending a message to the LMO node or to the network node that instructs the LMO node or the network node to adopt a robust modulation profile for transmissions to the NC; and
   wherein the message instructing adoption of a robust modulation profile is not sent to the LMO node if interference is detected on the link between the network node and the NC but is not detected on the link between the LMO node and the NC.

2. The method of claim 1, wherein the network is a Multimedia over Coax Alliance (MoCA) network.

3. The method of claim 2, wherein the robust modulation profile is defined by a diversity mode in a MoCA standard.

4. The method of claim 1, wherein the message instructing adoption of a robust modulation profile is sent in a beacon packet.

5. The method of claim 1, wherein the message instructing adoption of a robust modulation profile is sent in a Media Access Plan (MAP) packet.

6. The method of claim 5, further comprising periodically sending the message to the LMO node or the network node until the LMO completes.

7. The method of claim 1, wherein detecting interference includes receiving more than a predetermined number of probe requests within a predetermined time interval.

8. The method of claim 1, wherein detecting interference includes receiving more than a predetermined number of probe reports within a predetermined time interval.

9. A network coordinator (NC), comprising:
   a receiver that receives at least one of a probe request or a probe report during a link maintenance operation (LMO) between a LMO node and a network node;
   a transmitter that transmits at least one of a probe request or a probe report during the LMO; and
   a processor coupled to the receiver and to the transmitter, the processor programmed to:
   detect interference on a link between the LMO node and the NC or on a link between the network node and the NC that interferes with reception of transmitted probe request or probe report; and in response to the detected interference, transmit a message from the NC to the LMO node or to the network node that instructs the LMO node or the network node to adopt a robust modulation profile for transmissions to the NC; and wherein the message instructing adoption of a robust modulation profile is not sent to the LMO node if interference is detected on the link between the network node and the NC but is not detected on the link between the LMO node and the NC.

10. The NC of claim 9, wherein the NC operates in a Multimedia over Coax Alliance (MoCA) network.

11. The NC of claim 10, wherein the robust modulation profile is defined by a diversity mode in a MoCA standard.

12. The NC of claim 11, wherein the message instructing adoption of a robust modulation profile is sent in a beacon packet.

13. The NC of claim 11, wherein the message instructing adoption of a robust modulation profile is sent in a Media Access Plan (MAP) packet.

14. The NC of claim 9, wherein the NC periodically sends the message to the LMO node or the network node until the LMO completes.

15. A method for adjusting modulation on a network, the method comprising:
  determining that at least one of a probe request or a probe report has been transmitted during a link maintenance operation (LMO) between an LMO node and a network node;
  detecting interference on a link between the LMO node and a network coordinator (NC) or on a link between the network node and the NC that interferes with reception of transmitted probe request or probe report; and
  in response to the detected interference, the NC sending a message to the LMO node or to the network node that instructs the LMO node or the network node to adopt a robust modulation profile for transmissions to the NC; and
  wherein the message instructing adoption of a robust modulation profile is not sent to the network node if interference is detected on the link between LMO node and the NC but is not detected on the link between the network node and the NC.

16. The method of claim 15, wherein the network is a Multimedia over Coax Alliance (MoCA) network.

17. The method of claim 16, wherein the robust modulation profile is defined by a diversity mode in a MoCA standard.

18. The method of claim 15, wherein the message instructing adoption of a robust modulation profile is sent in a beacon packet.

19. The method of claim 15, wherein the message instructing adoption of a robust modulation profile is sent in a Media Access Plan (MAP) packet.

20. The method of claim 19, further comprising periodically sending the message to the LMO node or the network node until the LMO completes.

21. The method of claim 15, wherein detecting interference includes receiving more than a predetermined number of probe requests within a predetermined time interval.

22. The method of claim 15, wherein detecting interference includes receiving more than a predetermined number of probe reports within a predetermined time interval.

23. A network coordinator (NC), comprising:
  a receiver that receives at least one of a probe request or a probe report during a link maintenance operation (LMO) between a LMO node and a network node;
  a transmitter that transmits at least one of a probe request or a probe report during the LMO; and
  a processor coupled to the receiver and to the transmitter, the processor programmed to:
    detect interference on a link between the LMO node and the NC or on a link between the network node and the NC that interferes with reception of transmitted probe request or probe report; and
    in response to the detected interference, transmit a message from the NC to the LMO node or to the network node that instructs the LMO node or the network node to adopt a robust modulation profile for transmissions to the NC; and
  wherein the message instructing adoption of a robust modulation profile is not sent to the network node if interference is detected on the link between LMO node and the NC but is not detected on the link between the network node and the NC.

24. The NC of claim 23, wherein the NC operates in a Multimedia over Coax Alliance (MoCA) network.

25. The NC of claim 24, wherein the robust modulation profile is defined by a diversity mode in a MoCA standard.

26. The NC of claim 25, wherein the message instructing adoption of a robust modulation profile is sent in a beacon packet.

27. The NC of claim 25, wherein the message instructing adoption of a robust modulation profile is sent in a Media Access Plan (MAP) packet.

28. The NC of claim 23, wherein the NC periodically sends the message to the LMO node or the network node until the LMO completes.

29. The NC of claim 23, wherein the message instructing adoption of a robust modulation profile is sent to the LMO node in response to the NC detecting interference on the link between the LMO node and the NC, and wherein the message includes a diversity mode override.

* * * * *